(12) United States Patent
Hosoi

(10) Patent No.: US 9,186,943 B2
(45) Date of Patent: Nov. 17, 2015

(54) SUSPENSION ARM FOR AUTOMOBILE

(71) Applicant: KABUSHIKI KAISHA KOBE SEIKO SHO (Kobe Steel, Ltd.), Kobe-shi (JP)

(72) Inventor: Hiroaki Hosoi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/314,090

(22) Filed: Jun. 25, 2014

(65) Prior Publication Data

US 2015/0001826 A1    Jan. 1, 2015

(30) Foreign Application Priority Data

Jun. 26, 2013   (JP) .................. 2013-133874

(51) Int. Cl.
*B60G 7/00* (2006.01)
*C22F 1/04* (2006.01)

(52) U.S. Cl.
CPC . *B60G 7/001* (2013.01); *C22F 1/04* (2013.01); *B60G 2206/122* (2013.01); *B60G 2206/13* (2013.01); *B60G 2206/16* (2013.01); *B60G 2206/81022* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,857,659 A | * | 1/1999 | Kato et al. | 248/634 |
| 5,992,867 A | * | 11/1999 | Kato et al. | 280/124.134 |
| 7,293,787 B2 | * | 11/2007 | Nunez et al. | 280/124.134 |
| 8,025,301 B2 | * | 9/2011 | Guttilla et al. | 280/124.134 |
| 8,651,504 B2 | * | 2/2014 | Gerhards et al. | 280/124.134 |
| 2002/0005621 A1 | * | 1/2002 | Christophliemke et al. | 280/124.134 |
| 2009/0008891 A1 | * | 1/2009 | Jang et al. | 280/124.134 |
| 2011/0127743 A1 | * | 6/2011 | Musha | 280/124.1 |
| 2013/0205591 A1 | * | 8/2013 | Santini et al. | 29/897.2 |
| 2014/0144024 A1 | * | 5/2014 | Byrne, II | 29/897.2 |
| 2014/0361508 A1 | * | 12/2014 | Ohta et al. | 280/124.134 |

FOREIGN PATENT DOCUMENTS

| | | | | |
|---|---|---|---|---|
| DE | 102006011107 B3 | * | 7/2007 | B60G 7/00 |
| DE | 102006062570 A1 | * | 7/2008 | B60G 7/00 |
| DE | 102009054999 A1 | * | 6/2011 | |
| DE | 202011000609 U1 | * | 8/2012 | |
| DE | 102012201512 A1 | * | 8/2013 | |
| JP | 05-112111 | | 5/1993 | |
| JP | 2002-307921 | | 10/2002 | |
| JP | 2004-299663 | | 10/2004 | |
| JP | 2005-082140 | | 3/2005 | |

* cited by examiner

*Primary Examiner* — Nicole Verley
(74) *Attorney, Agent, or Firm* — Oblon, McClelland, Maier & Neustadt, L.L.P.

(57) ABSTRACT

An L-shape vehicular suspension arm includes a unitary body forged from an aluminum alloy. The unitary body includes a web and ribs. The web is substantially planar, and the ribs extend from surfaces of the web at peripheral edges of the web. In cross-section, at least one part of the unitary body has a U-shape, an H-shape, or an inverted U-shape, such that dimensions of the unitary body satisfy expression (1) or (2):

$$0.05 \le (H-Hr)/Hr \le 0.25 \quad (1)$$

$$4 \le (H-Hr)/Hr \le 19 \quad (2)$$

where H is a total height of the unitary body, and Hr is a height from a center of the web to a lowermost point of the unitary body.

17 Claims, 8 Drawing Sheets

SECTION A-A

SECTION A-A

SECTION B-B

SECTION A-A

SECTION B-B

SECTION A-A

SECTION B-B

SECTION A-A

SECTION B-B

SECTION A-A

SECTION B-B

SECTION A-A

SECTION B-B

SECTION A-A

SECTION B-B

SUSPENSION ARM FOR AUTOMOBILE

CROSS REFERENCE TO RELATED APPLICATIONS

This application claims priority to Japanese Patent Application No. 2013-133874, filed Jun. 26, 2013, the disclosure of which is incorporated herein by reference in its entirety.

BACKGROUND

The present invention relates to a suspension arm for an automobile manufactured by forging.

Conventionally, a suspension arm for an automobile having an arm section of an L-shape in a plan view is used for a strut type suspension and a double wishbone type suspension (automobile chassis component), and is known to have the advantage of improving the riding quality and the traveling stability and reducing the upsprung weight (refer to JP-A H5-112111, JP-A 2004-299663, and JP-A 2005-082140).

With respect to the suspension arm for an automobile having an arm section of an L-shape described above, it is known that an H-shape cross-sectional structure that can increase the in-plane bending rigidity is adopted so as to sufficiently stand the in-plane moment inevitably applied to the arm section of an L-shape (which is the moment applied within a plane perpendicular to the vertical direction of the vehicle) because the input load in the longitudinal direction of the automobile (will be hereinafter also referred to as "vehicle") is most severe.

Also, as a suspension arm for an automobile aiming to achieve substantial weight reduction while securing the strength, one employing an arm section of an L-shape using nodular graphite cast iron material and having a channel shape cross-sectional structure is also known (refer to JP-A 2002-307921).

However, the suspension arm for an automobile employing the arm section of an L-shape having the H-shape cross-sectional structure described above had a problem that although it was designed considering the vibration mode by the in-plane moment generated at a natural frequency of a comparatively high order (that is, having sufficient in-plane bending rigidity), it was not designed sufficiently considering the vibration mode by the out-of-plane moment generated mainly at a natural frequency of a low order (first order and second order for example). That is, there was a problem that the out-of-plane bending rigidity (strength) was insufficient.

Also, the suspension arm for an automobile employing the arm section of an L-shape having a channel shape cross-sectional structure disclosed in JP-A 2002-307921 described above employed a cross-sectional structure that couldn't be manufactured by forging cost effectively, and therefore there was a problem that it was imperative to manufacture the same by casting.

SUMMARY

The object of the present invention is to provide a suspension arm for an automobile capable of securing the strength (particularly the out-of-plane bending rigidity) with respect to the input load in the longitudinal direction of a vehicle and improving the natural frequency of a low order even while employing a light weight and cost effective structure.

In order to achieve the object, an aspect described in claim 1 of the present invention is a suspension arm for an automobile including an arm section made of an aluminum alloy manufactured by forging whose one end being joined to a ball joint support section that is attached to the axle side of the automobile and the middle and the other end being joined to a vehicle body side engaging section that is attached to the vehicle body side respectively, the plan view of the arm section being of an L-shape, and the total length in the longitudinal direction from one end to the other end of the L-shape arm section being L, in which a cross section perpendicular to the longitudinal direction of the L-shape arm section is in a shape formed of a center section (will be hereinafter referred to as a "web") with the thickness Tw and two peripheral sections (will be hereinafter referred to as "ribs") having the width Tr narrower than the width of the web and the height H of a value larger than the thickness Tw of the web, and at least the shape of the cross section between L/4 to 3×L/4 in the longitudinal direction from one end of the L-shape arm section has a cross-sectional shape of a U-shape or an H-shape defined by the following expression (1) or (2):

$$0.05 \leq (H-Hr)/Hr \leq 0.25 \quad (1)$$

$$4 \leq (H-Hr)/Hr \leq 19 \quad (2)$$

where the ribs direct the height H thereof in the vertical direction of the automobile, the web is perpendicular to the ribs, and the distance from one end in the vertical direction of the rib to the center of the thickness Tw of the web is Hr.

An aspect described in claim 2 is characterized in that, in the aspect described in claim 1, the cross section perpendicular to the longitudinal direction of portions within L/4 in the longitudinal direction from one end and the other end of the L-shape arm section respectively is defined by the following expression (3):

$$(H-Hr)/Hr = 1 \quad (3)$$

As described above, the present invention is characterized by being a suspension arm for an automobile including an arm section made of an aluminum alloy manufactured by forging whose one end being joined to a ball joint support section that is attached to the axle side of the automobile and the middle and the other end being joined to a vehicle body side engaging section that is attached to the vehicle body side respectively, the plan view of the arm section being of an L-shape, and the total length in the longitudinal direction from one end to the other end of the L-shape arm section being L, in which a cross section perpendicular to the longitudinal direction of the L-shape arm section is in a shape formed of a web with the thickness Tw and two ribs having the width Tr narrower than the width of the web and the height H of a value larger than the thickness Tw of the web, and at least the shape of the cross section between L/4 to 3×L/4 in the longitudinal direction from one end of the L-shape arm section has a cross-sectional shape of a U-shape or an H-shape defined by the following expression (1) or (2):

$$0.05 \leq (H-Hr)/Hr \leq 0.25 \quad (1)$$

$$4 \leq (H-Hr)/Hr \leq 19 \quad (2)$$

where the ribs direct the height H thereof in the vertical direction of the automobile, the web is perpendicular to the ribs, and the distance from one end in the vertical direction of the rib to the center of the thickness Tw of the web is Hr.

Thus, a suspension arm for an automobile can be achieved which is capable of securing the strength (particularly the out-of-plane bending rigidity) with respect to the input load in the longitudinal direction of a vehicle and improving the natural frequency of a low order even while employing a light weight and cost effective structure (that is an arm section made of an aluminum alloy manufactured by forging).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1A to 1C illustrate a suspension arm for an automobile of the first embodiment of the present invention, in which FIG. 1A is a plan view of the suspension arm, FIG. 1B is A-A cross-sectional view of the arm section of the suspension arm, and FIG. 1C is B-B cross-sectional view of the arm section of the suspension arm.

FIGS. 3A to 3C illustrate a suspension arm for an automobile of a second embodiment of the present invention, in which FIG. 3A is a plan view of the suspension arm, FIG. 3B is A-A cross-sectional view of the arm section of the suspension arm, and FIG. 3C is B-B cross-sectional view of the arm section of the suspension arm.

FIGS. 4A to 4C illustrate a suspension arm for an automobile of a third embodiment of the present invention in which FIG. 4A is a plan view of the suspension arm, FIG. 4B is A-A cross-sectional view of the arm section of the suspension arm, and FIG. 4C is B-B cross-sectional view of the arm section of the suspension arm.

FIGS. 5A to 5C illustrate a suspension arm for an automobile of a fourth embodiment of the present invention, in which FIG. 5A is a plan view of the suspension arm, FIG. 5B is A-A cross-sectional view of the arm section of the suspension arm, and FIG. 5C is B-B cross-sectional view of the arm section of the suspension arm.

FIGS. 6A to 6C illustrate a suspension arm for an automobile of a fifth embodiment of the present invention, in which FIG. 6A is a plan view of the suspension arm, FIG. 6B is A-A cross-sectional view of the arm section of the suspension arm, and FIG. 6C is B-B cross-sectional view of the arm section of the suspension arm.

FIGS. 7A to 7C illustrate a suspension arm for an automobile of a sixth embodiment of the present invention, in which FIG. 7A is a plan view of the suspension arm, FIG. 7B is A-A cross-sectional view of the arm section of the suspension arm, and FIG. 7C is B-B cross-sectional view of the arm section of the suspension arm.

FIGS. 8A to 8C illustrate a suspension arm for an automobile of an eighth embodiment of the present invention, in which FIG. 8A is a plan view of the suspension arm, FIG. 8B is A-A cross-sectional view of the arm section of the suspension arm, and FIG. 8C is B-B cross-sectional view of the arm section of the suspension arm.

DETAILED DESCRIPTION OF EXEMPLARY EMBODIMENTS

The present inventor made intensive studies on how to achieve a suspension arm for an automobile which was capable of securing the strength (particularly the out-of-plane bending rigidity) with respect to the input load in the longitudinal direction of a vehicle and improving the natural frequency of a low order even while employing a light weight and cost effective structure (that is an arm section made of an aluminum alloy manufactured by forging). As a result, it was found out for the first time that there existed a cross-sectional shape of the arm section which could satisfy both of "the rigidity fulfillment degree of the arm section with respect to the out-of-plane moment" and "the easiness of manufacturing of the arm section by forging" as shown in Table 1 below. Below, the present invention will be described in detail exemplifying the embodiments.

TABLE 1

| Cross-sectional shape of arm section 7 | Rigidity fulfillment degree of arm section 7 with respect to out-of-plane moment | Easiness in manufacturing arm section 7 by forging | Remarks |
| --- | --- | --- | --- |
|  | Excellent | Fair | Invention Example 1 (refer to FIGS. 1A to 1C), Invention Example 2 (refer to FIGS. 3A to 3C), Invention Example 3 (refer to FIGS. 4A to 4C), Invention Example 4 (refer to FIGS. 5A to 5C) |
|  | Good | Excellent | Invention Example 5 (refer to FIGS. 6A to 6C), Invention Example 6 (refer to FIGS. 7A to 7C) |
|  | NG | Excellent | Comparative example |
|  | Good | Excellent | Invention Example 7 (not illustrated) |
|  | Excellent | Fair | Invention Example 8 (refer to FIGS. 8A to 8C) |

First Embodiment

Figure 1A:
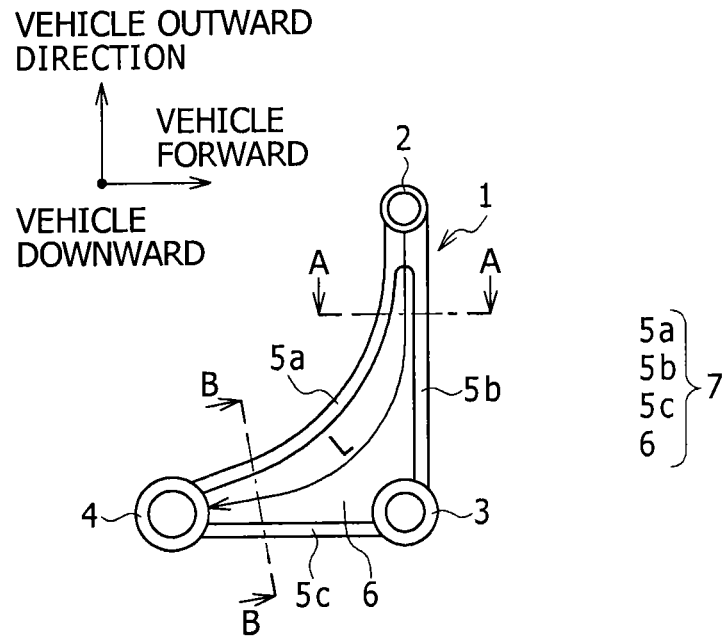
Figure 1B:
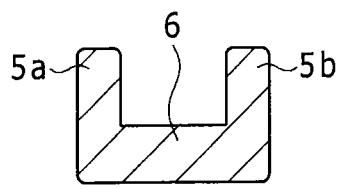
Figure 1C:
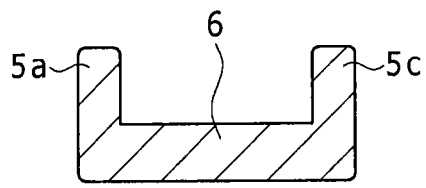

FIGS. 1A to 1C illustrate a suspension arm for an automobile of a first embodiment of the present invention (the invention example 1 of Table 1 above), in which FIG. 1A is a plan view of the suspension arm, FIG. 1B is a cross section A-A of the arm section, and FIG. 1C is a cross section B-B of the arm section. In the coordinate system illustrated in FIG. 1A, "vehicle outward direction" directed upward within the paper surface indicates the axle side for example, "vehicle forward" directed to the right side within the paper surface literally indicates the direction the vehicle advances forward, and "vehicle downward" directed to the direction perpendicular to the paper surface indicates the direction the vehicle side is viewed from the road surface side below the vehicle. This definition is also to be applied commonly to FIGS. 2A to 8C.

In FIG. 1A, 1 is a suspension arm for an automobile including an arm section 7 having an L-shape in a plan view, 2 is a ball joint support section attached to the axle side of the vehicle, 3 is a bush support section A as a vehicle body side engaging section attached to the vehicle body side, 4 is a bush support section B as a vehicle body side engaging section attached to the vehicle body side, 5a is a rib as a peripheral section that continues from the ball joint support section 2 (one end side) in the arm section 7 to the bush support section B {4 (the other end side)}, 5b is a rib as a peripheral section that continues from the ball joint support section 2 (one end side) to the bush support section A {3 (the middle side)}, 5c is a rib as a peripheral section that continues from the bush support section A {3 (the middle side)} to the bush support section B {4 (the other end side)}, and 6 is a web as a center section perpendicular to the rib 5a and the rib 5b respectively and a web as a center section perpendicular to the rib 5a and the rib 5c respectively. Also, the arm section 7 is formed of the ribs 5a, 5b, 5c and the web 6, and the total length in the longitudinal direction from one end of the arm section 7 to the other end is L.

Also, FIGS. 1B and 1C are A-A cross-sectional view and B-B cross-sectional view of the arm section 7 illustrated in FIG. 1A respectively. As illustrated in FIGS. 1B and 1C, the cross sections perpendicular to the longitudinal direction of the arm section 7 have a U-like cross-sectional shape, and are formed of "the web 6 and the two ribs 5a, 5b having a width narrower than the width of the web 6 and a height of a value larger than the thickness of the web 6" and "the web 6 and the two ribs 5a, 5c having a width narrower than the width of the web 6 and a height of a value larger than the thickness of the web 6" respectively.

Here, "the width of the web 6" means "the dimension of the web 6 as measured in the direction perpendicular to the longitudinal direction of the arm section 7 having the total length L and the direction of the paper surface", "the thickness of the web 6" means "the dimension of the web 6 as measured in the direction perpendicular to the width direction of the web 6 and the direction of the paper surface", and "the height of the ribs 5a, 5b, 5c" means "the dimension of the ribs 5a, 5b, 5c as measured in the direction perpendicular to the width direction of the web 6 and the direction of the paper surface in the ribs 5a, 5b, 5c".

Also, here, the U-like or H-like cross-sectional shape referred to in the present invention means that the total shape of the cross section is generally or approximately in the U-shape or in the H-shape, and not only the literal U-shape or H-shape but also a little deviation or shape change therefrom is allowable.

The U-like cross-sectional shape in the suspension arm for an automobile 1 is not uniform in the size and shape in the longitudinal direction thereof but continuously changes along the longitudinal direction thereof according to the size and the cross-sectional shape in the portion (position) in the longitudinal direction of the arm section such as the arm section with a narrow width of FIG. 1b (section A-A) and the arm section with a wide width of FIG. 1c (section B-B). This is also similar with respect to the embodiments described below.

Figure 2A:
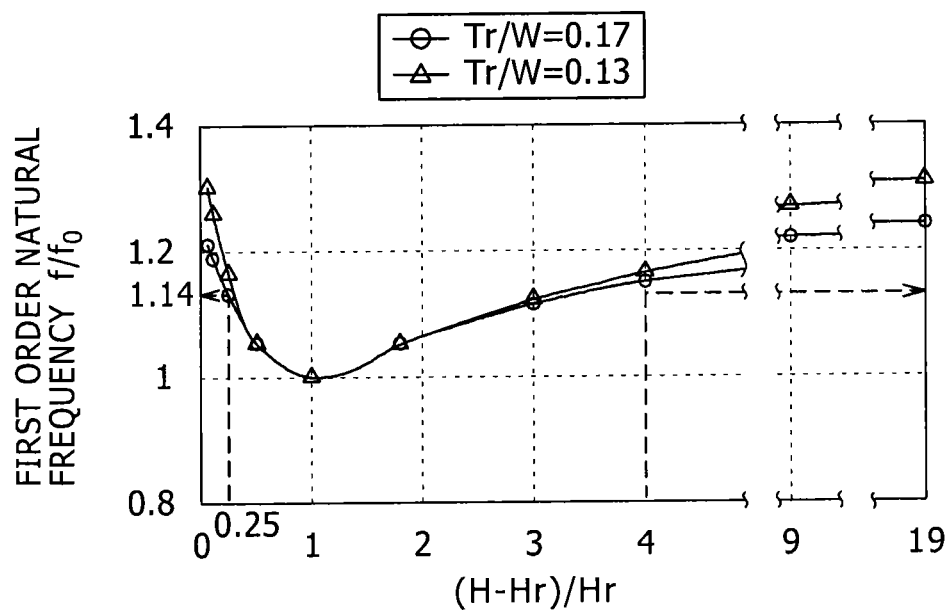
FIG. 2A is an explanatory drawing for explaining the relation between the ratio of (H−Hr)/Hr and a first order natural frequency of an arm section of a suspension arm for an automobile of the present invention.
Figure 2B:
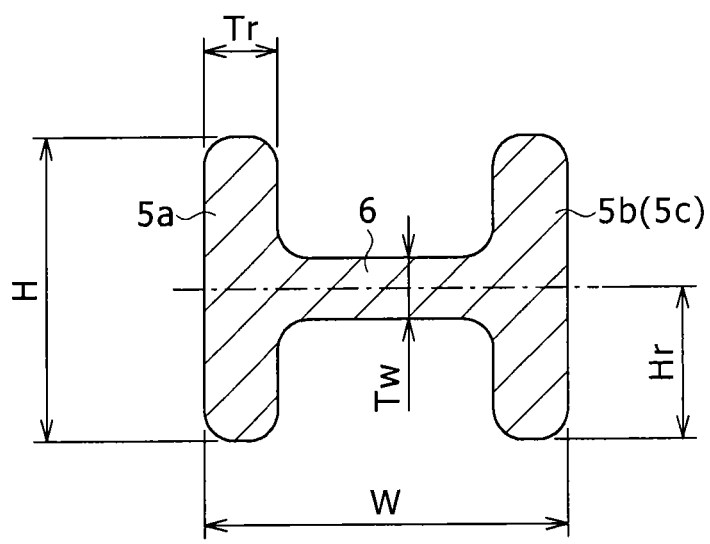
FIG. 2B is an explanatory drawing for explaining respective portions of the cross section of the arm section of a suspension arm for an automobile of the present invention.

FIG. 2A is an explanatory drawing for explaining the relation between the ratio of (H−Hr)/Hr and a first order natural frequency of an arm section of a suspension arm for an automobile of the present invention, and FIG. 2B is an explanatory drawing for explaining respective portions of the cross section of the arm section.

In FIG. 2B, the width of the ribs 5a, 5b, 5c is Tr, the height H thereof is directed in the vertical direction of the automobile (vehicle), the web 6 is perpendicular to the ribs 5a, 5b, 5c respectively, and the distance from one end in the vertical direction of the ribs 5a, 5b, 5c to the center of the thickness Tw of the web 6 is Hr. Also, the distance between the outer wall of the rib 5a and the outer wall of the rib 5b as well as the distance between the outer wall of the rib 5a and the outer wall of the rib 5c are made W.

First, the suspension arm for an automobile illustrated in FIGS. 1A to 1C (will be hereinafter referred to as "the present invention example 1") will be described using FIG. 2A and FIG. 2B. Below, the cases of Tr/W=0.13, 0.17 for example will be described.

The cross-sectional structure of the present invention example 1 is a U-shape structure in which the web 6 is arranged in each one end in the vertical direction (the lowermost end position) of the ribs 5a, 5b, 5c (refer to FIG. 1b, FIG. 1c). This corresponds to a case the horizontal axis (H−Hr)/Hr illustrated in FIG. 2A is 19. On the other hand, the conventional H-shape cross-sectional structure is a case the horizontal axis (H−Hr)/Hr illustrated in FIG. 2A is 1. This conventional H-shape cross-sectional structure is a comparative example shown in the center of Table 1 above, and, in Table 1, the natural frequency of the first order f0 of the comparative example {that is, the natural frequency generating a vibration mode by the out-of-plane moment (will be hereinafter simply referred to also as "the natural frequency of the out-of-plane bending mode")} becomes the reference of the performance in comparison.

Here, in a beam having a uniform cross-sectional shape for example, it is known that the natural frequency of the out-of-plane bending mode is proportional to (length)-1×(out-of-plane bending rigidity/mass per unit length)0.5 in general. Based on this relation, it is led out that the natural frequency is proportional to (the moment inertia of area of out-of-plane bending/cross-sectional area)0.5 when the distance between the support points and the material do not vary. In applying this to leading out of the natural frequency of the first order of the present invention example 1, in the cases of Tr/W=0.17, 0.13, f/f0 becomes 1.24, 1.31 respectively, and improvement of approximately 30% with respect to the comparative example is possible. As marked "excellent" in Table 1 above, this achieves the strength with respect to the input load in the longitudinal direction of the vehicle {particularly the rigidity fulfillment degree of the arm section 7 with respect to the out-of-plane moment is high (the out-of-plane bending rigidity is secured)} and the predetermined target value (f/f0=1.14). That is, improvement of the natural frequency of a low order (the first order for example) is possible. Also, as marked "fair" in Table 1 above, when the cross-sectional shape is as that of the arm section 7 of the present invention example 1 (refer to FIGS. 1A to 1C), manufacturing by forging is also comparatively easy.

Second Embodiment

Figure 3A:
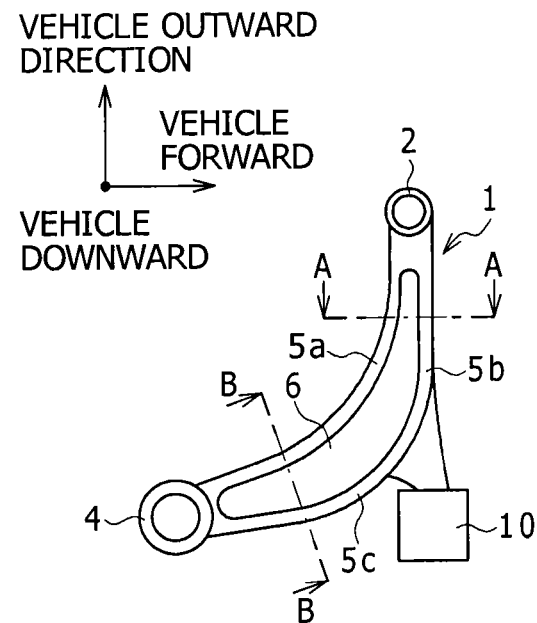
Figure 3B:
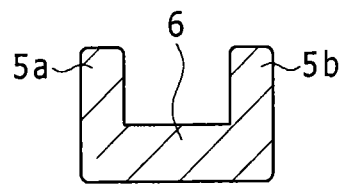
Figure 3C:
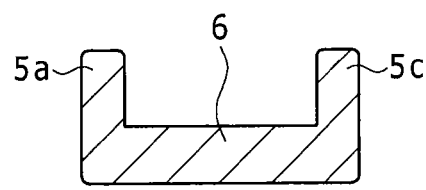

FIGS. 3A to 3C illustrate a suspension arm for an automobile of a second embodiment of the present invention (the invention example 2 of Table 1 above) having a U-like cross-sectional shape similar to that of the first embodiment, in which FIG. 3A is a plan view, FIG. 3B is A-A cross-sectional view of the arm section, and FIG. 3C is B-B cross-sectional view of the arm section. In the present embodiment, with respect to the portion basically based on the concept identical to that of the first embodiment, same reference signs will be given and detailed description thereof will be omitted, and the portions different from the first embodiment 1 will be described in detail.

In FIG. 3A, 10 is a bush support section C as a vehicle body side engaging section attached to the vehicle body side, joined to the middle of the arm section 7, and directed to the in-plane direction. Also, in the present embodiment, the width of the web 6 near the middle of the arm section 7 is narrower compared with the first embodiment. Even in such a case, when Tr/W is fixed as the first embodiment and the ratio of (H−Hr)/Hr is made 19, similar result is obtained. That is, with respect to the present invention example 2 also, when 4≤(H−Hr)/Hr≤19 shown in the expression (2) is satisfied, as marked "excellent" in Table 1 above, the strength with respect to the input load in the longitudinal direction of the vehicle {particularly the rigidity fulfillment degree of the arm section 7 with respect to the out-of-plane moment is high (the out-of-plane bending rigidity is secured)} and the predetermined target value (f/f0=1.14) are achieved. That is, improvement of the natural frequency of a low order (the first order for example) is possible. Also, as marked "fair" in Table 1 above, when the cross-sectional shape is as that of the arm section 7 of the present invention example 2 (refer to FIGS. 3A to 3C), manufacturing by forging is also comparatively easy.

Third Embodiment

Figure 4A:
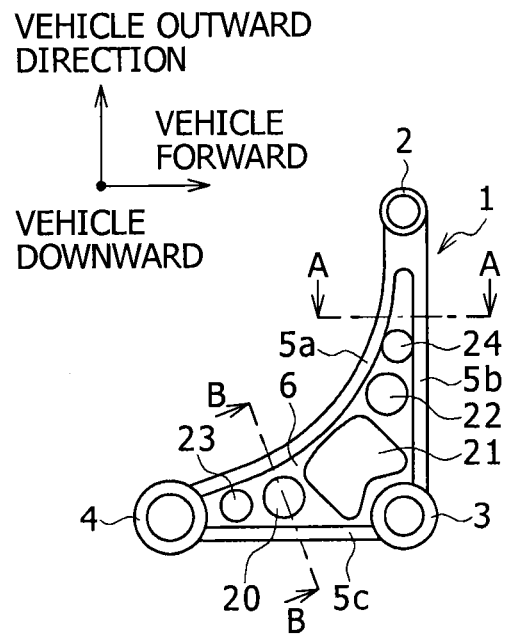
Figure 4B:
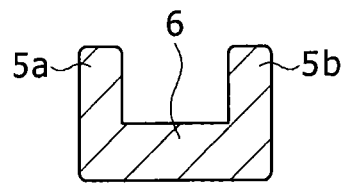
Figure 4C:
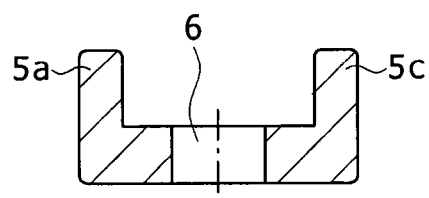

FIGS. 4A to 4C illustrate a suspension arm for an automobile of a third embodiment of the present invention (the invention example 3 of Table 1 above) having a U-like cross-sectional shape similar to that of the first and second embodiments, in which FIG. 4A is a plan view of the suspension arm, FIG. 4B is A-A cross-sectional view of the arm section, and FIG. 4C is B-B cross-sectional view of the arm section. In the present embodiment, with respect to the portion basically based on the concept identical to that of the first embodiment, same reference signs will be given and detailed description thereof will be omitted, and the portions different from the first embodiment will be described in detail.

In FIG. 4A, 20, 21, 22, 23, 24 are trim holes for weight reduction of the suspension arm for an automobile arranged respectively in the web 6 illustrated in above FIGS. 1A to 1C. Even in such a case, when Tr/W is fixed as the invention example 1 and the ratio of (H−Hr)/Hr is made 19, a result similar to the invention example 1 is obtained. That is, when 4≤(H−Hr)/Hr≤19 shown in the expression (2) is satisfied, as marked "excellent" in Table 1 above, the strength with respect to the input load in the longitudinal direction of the vehicle {particularly the rigidity fulfillment degree of the arm section 7 with respect to the out-of-plane moment is high (the out-of-plane bending rigidity is secured)} and the predetermined target value (f/f0=1.14) are achieved. That is, improvement of the natural frequency of a low order (the first order for example) is possible. Also, as marked "fair" in Table 1 above, with the cross-sectional shape and the web 6 shape as those of the arm section 7 of the present invention example 3 (refer to FIGS. 3A to 3C), manufacturing by forging is also comparatively easy. Further, because the trim holes 20, 21, 22, 23, 24 are arranged in the present invention example 3, further weight reduction of the suspension arm for an automobile is possible.

Fourth Embodiment

Figure 5A:
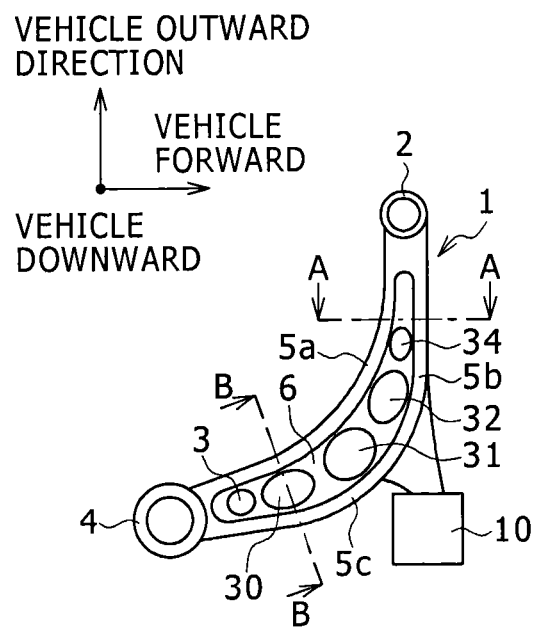
Figure 5B:
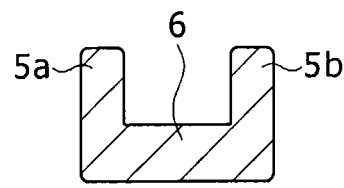
Figure 5C:
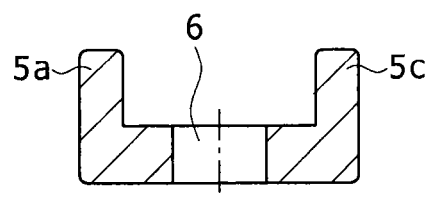

FIGS. 5A to 5C illustrate a suspension arm for an automobile of a fourth embodiment of the present invention (the invention example 4 of Table 1 above), in which FIG. 5A is a plan view of the suspension arm, FIG. 5B is A-A cross-sectional view of the arm section, and FIG. 5C is B-B cross-sectional view of the arm section. In the present embodiment, with respect to the portion basically based on the concept identical to that of the second embodiment, same reference signs will be given and detailed description thereof will be omitted, and the portions different from the second embodiment will be described in detail.

In FIG. 5A, 30, 31, 32, 33, 34 are trim holes arranged respectively in the web 6 illustrated in above FIGS. 3A to 3C. Even in such a case, when Tr/W is fixed as the invention example 1 and the ratio of (H−Hr)/Hr is made 19, a result similar to the invention example 2 is obtained. That is, when 4≤(H−Hr)/Hr≤19 shown in the expression (2) is satisfied, as marked "excellent" in Table 1 above, the strength with respect to the input load in the longitudinal direction of the vehicle {particularly the rigidity fulfillment degree of the arm section 7 with respect to the out-of-plane moment is high (the out-of-plane bending rigidity is secured)} and the predetermined target value (f/f0=1.14) are achieved. That is, improvement of the natural frequency of a low order (the first order for example) is possible. Also, as marked "fair" in Table 1 above, with the cross-sectional shape and the web 6 shape as those of the arm section 7 of the present invention example 4 (refer to FIG. 5A to FIG. 5C), manufacturing by forging is also comparatively easy. Further, because the trim holes 30, 31, 32, 33, 34 are arranged in the present invention example 4, further weight reduction of the suspension arm for an automobile is possible.

Fifth Embodiment

Figure 6A:
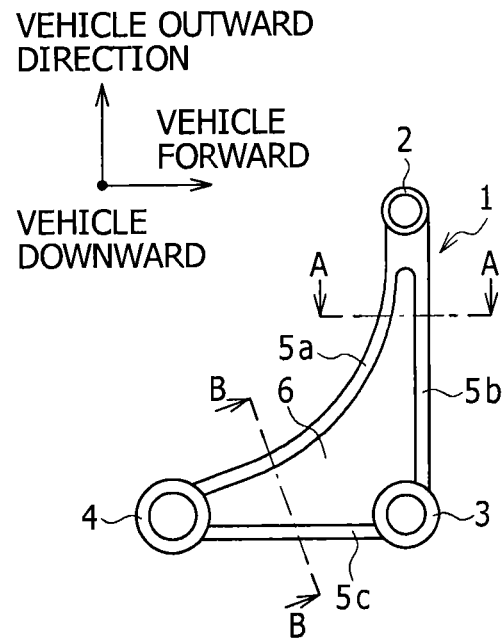
Figure 6B:
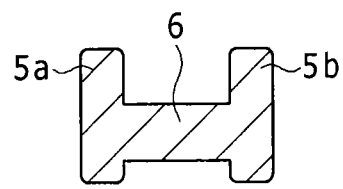
Figure 6C:
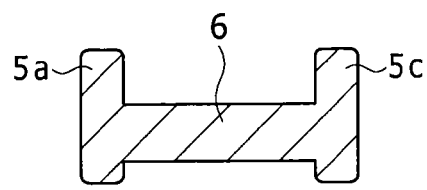

FIGS. 6A to 6C illustrate a suspension arm for an automobile of a fifth embodiment of the present invention (the invention example 5) having an H-like cross-sectional shape, in which FIG. 6A is a plan view of the suspension arm, FIG. 6B is A-A cross-sectional view of the arm section, and FIG. 6C is B-B cross-sectional view of the arm section. In the present embodiment, with respect to the portion basically based on the concept identical to that of the first embodiment, same reference signs will be given and detailed description thereof will be omitted, and the portions different from the first embodiment will be described in detail.

As illustrated in FIGS. 6B and 6C, compared with the case of FIGS. 1A to 1C, the present embodiment has an H-like cross-sectional shape structure in which the web 6 is arranged at a position moved upward by a predetermined amount from each one end in the vertical direction (the lowermost position) of the ribs 5a, 5b, 5c. This corresponds to a case the horizontal axis (H−Hr)/Hr illustrated in FIG. 2A is 4. The H-like cross-sectional shape of this case is apparently different from the cross-sectional shape of the case (H−Hr)/Hr described above is 1 (that is the conventional H-like cross-sectional structure). As a result, in the case of Tr/W=0.17, 0.13, f/f0 becomes 1.16, 1.17 respectively, and improvement of approximately 16% or more of the natural frequency of the first order with respect to the comparative example is possible (corresponding to the present invention example 5 of Table 1 above). That is, as marked "good" in Table 1 above, it is possible to achieve the strength with respect to the input load in the longitudinal direction of the vehicle {particularly the rigidity fulfillment degree of the arm section 7 with respect to the out-of-plane moment is satisfied (the out-of-plane bending rigidity is secured)} and the predetermined target value (f/f0=1.14) and to improve the natural frequency of a low order (the first order for example). Also, as marked "excellent" in Table 1 above, when the cross-sectional shape is as that of the arm section 7 of the present invention example 5 (refer to FIG. 6A to FIG. 6C), manufacturing by forging is easy.

Sixth Embodiment

Figure 7A:
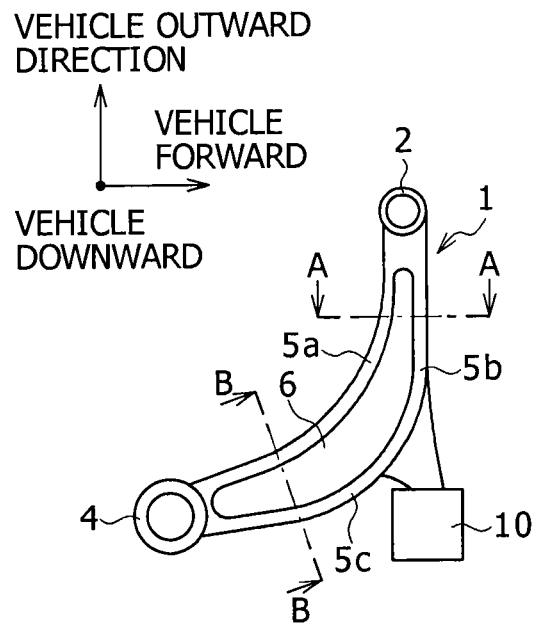
Figure 7B:
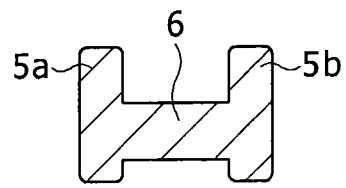
Figure 7C:
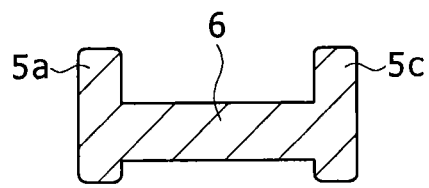

FIGS. 7A to 7C illustrate a suspension arm for an automobile of a sixth embodiment of the present invention (the invention example 6 of Table 1 above) having an H-like cross-sectional shape which is the same as that of the fifth embodiment, in which FIG. 7A is a plan view of the suspension arm, FIG. 7B is A-A cross-sectional view of the arm section, and FIG. 7C is B-B cross-sectional view of the arm section. In the present embodiment, with respect to the portion basically based on the concept identical to that of the second embodiment, same reference signs will be given and detailed description thereof will be omitted, and the portions different from the second embodiment will be described in detail.

As illustrated in FIGS. 7B and 7C, compared with the case of FIGS. 3A to 3C, the present embodiment has a structure in which the web 6 is arranged at a position moved upward by a predetermined amount from each one end in the vertical direction (the lowermost position) of the ribs 5a, 5b, 5c. This corresponds, for example, to a case the horizontal axis (H−Hr)/Hr illustrated in FIG. 2A is 4. The H-like cross-sectional shape of this case is also apparently different from the cross-sectional shape of the case (H−Hr)/Hr described above is 1 (that is the conventional H-like cross-sectional structure). As a result, similarly to the case of the present invention example 5 described above, improvement of approximately 16% or more of the natural frequency of the first order with respect to the comparative example is possible (corresponding to the present invention example 6 of Table 1 above). As marked "good" in Table 1 above, this achieves the strength with respect to the input load in the longitudinal direction of the vehicle {particularly the rigidity fulfillment degree of the arm section 7 with respect to the out-of-plane moment is satisfied (the out-of-plane bending rigidity is secured)} and the predetermined target value (f/f0=1.14). That is, improvement of the natural frequency of a low order (the first order for example) is possible. Also, as marked "excellent" in Table 1 above, when the cross-sectional shape is as that of the arm section 7 of the present invention example 6 (refer to FIG. 7A to FIG. 7C), manufacturing by forging is easy.

Seventh Embodiment

A suspension arm for an automobile of a seventh embodiment (not illustrated) of the present invention has an H-shape cross-sectional structure in which the cross-sectional shape of the arm section 7 in the invention example 5 (refer to FIG. 6A to FIG. 6C) of Table 1 above is vertically inverted in the present invention example 7 of Table 1 above. That is a structure in which the web 6 is arranged at a position moved downward by a predetermined amount from each of the other end in the vertical direction (the uppermost position) of the ribs 5a, 5b, 5c. This corresponds, for example, to a case the horizontal axis (H−Hr)/Hr illustrated in FIG. 2A for example is 0.25. In this case (the case of the present invention example 7), when Tr/W=0.17, 0.13, f/f0 becomes 1.14, 1.16 respectively, and improvement of approximately 14% or more of the natural frequency of the first order with respect to the comparative example is possible. That is, when 0.05≤(H−Hr)/Hr≤0.25 shown in the expression (1) above is satisfied, as marked "good" in Table 1 above, the strength with respect to the input load in the longitudinal direction of the vehicle {particularly the rigidity fulfillment degree of the arm section 7 with respect to the out-of-plane moment is satisfied (the out-of-plane bending rigidity is secured)} and the predetermined target value (f/f0=1.14) are achieved. That is, it is possible to improve the natural frequency of a low order (the first order for example). Also, as marked "excellent" in Table 1 above, when the cross-sectional shape is as that of the arm section 7 of the present invention example 7 (not illustrated), manufacturing by forging is easy. Further, the cross-sectional shape as that of the arm section 7 of the present invention example 7 is more preferable because the rainwater and mud hardly accumulate.

Eighth Embodiment

Figure 8A:
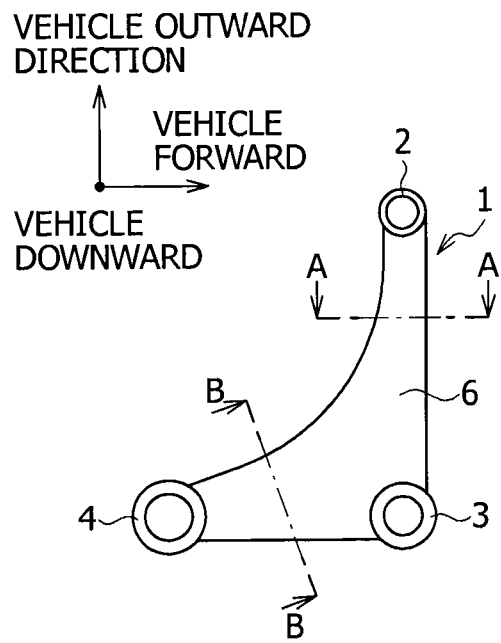
Figure 8B:
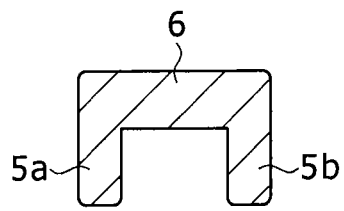
Figure 8C:
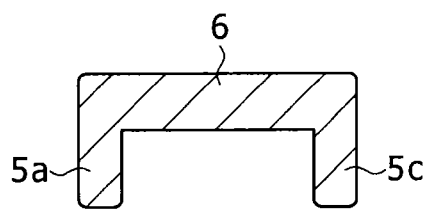

FIGS. 8A to 8C illustrate a suspension arm for an automobile of an eighth embodiment of the present invention (the invention example 8 of Table 1 above), in which FIG. 8A is a plan view of the suspension arm, FIG. 8B is A-A cross-sectional view of the arm section, and FIG. 8C is B-B cross-sectional view of the arm section. In the present embodiment, with respect to the portion basically based on the concept identical to that of the first embodiment, same reference signs will be given and detailed description thereof will be omitted, and the portions different from the first embodiment will be described in detail.

As illustrated in FIGS. 8B 8C, the present invention example 8 has an inverted U-shape cross-sectional structure in which the cross-sectional shape of the arm section 7 in the invention example 1 (refer to FIGS. 1A to 1C) is vertically inverted. That is a structure in which the web 6 is arranged at each of the other end in the vertical direction (the uppermost position) of the ribs 5a, 5b, 5c. This corresponds to a case the horizontal axis (H−Hr)/Hr illustrated in FIG. 2A is 0.05. In this case (the case of the present invention example 8), when Tr/W=0.17, 0.13, f/f0 becomes 1.21, 1.3 respectively, and improvement of approximately 20% or more of the natural frequency of the first order with respect to the comparative example is possible. That is, when 0.05≤(H−Hr)/Hr≤0.25 shown in the expression (1) above is satisfied, as marked "excellent" in Table 1 above, the strength with respect to the input load in the longitudinal direction of the vehicle {particularly the rigidity fulfillment degree of the arm section 7 with respect to the out-of-plane moment is high (the out-of-plane bending rigidity is secured)} and the predetermined target value (f/f0=1.14) are achieved. That means improvement of the natural frequency of a low order (the first order for example) is possible. Also, as marked "fair" in Table 1 above, when the cross-sectional shape is as that of the arm section 7 of the present invention example 8 (refer to FIG. 8A to FIG. 8C), manufacturing by forging is also comparatively easy. Further, the cross-sectional shape as that of the arm section 7 of the present invention example 8 is more preferable because the rainwater and mud hardly accumulate.

Also, in the present embodiments 1-8, the cases the predetermined cross-sectional shape described above was arranged over the total length L in the longitudinal direction of the arm section 7 were described, however the present invention is not necessarily limited to it, and the predetermined cross-sectional shape described above only has to be arranged at least between L/4 to 3×L/4 in the longitudinal direction from one end of the arm section 7.

Further, in the present embodiments 1-8, the cases the height H of the rib 5a and the rib 5b was the same to each other and the height H of the rib 5a and the rib 5c was the same to each other were described, however the present invention is not necessarily limited to it. That is, as long as the specific points described in the aspect in relation with claim 1 of the present application are satisfied, the height H of the rib 5a and the rib 5b may be different from each other. Similarly, as long as the specific points described in the aspect in relation with claim 1 of the present application are satisfied, the height H of the rib 5a and the rib 5c may also be different from each other.

Further, by arranging the predetermined cross-sectional shape described above between L/4 to 3×L/4 in the longitudinal direction from one end of the arm section 7 and making the shape of the cross section perpendicular to the longitudinal direction of the portions within L/4 in the longitudinal direction from one end and the other end respectively of the arm section 7 is made satisfy (H–Hr)/Hr=1 (that is, the H-shape cross-sectional structure), a suspension arm for an automobile having the arm section 7 strong against both of the in-plane moment and the out-of-plane moment can be achieved.

In a suspension arm for an automobile formed of an aluminum alloy forging of the present invention, the aluminum alloy used assures the required high corrosion resistance and durability such as high strength, stress corrosion cracking resistance and the like as a premise. Therefore, out of the aluminum alloys, 6000-series aluminum alloy standardized in JIS or AA is preferable. The specific chemical composition of the 6000-series aluminum alloy contains Si: 0.8-1.3%, Mg: 0.70-1.3% in mass % as the main elements, with Cu, Zn, Fe, Mn, Cr, Zr, Ti and the like being added thereto according to necessity, and the balance being Al and inevitable impurities.

The aluminum alloy forging (the suspension arm for an automobile) with such composition can be manufactured by an ordinary method similarly to the suspension arm of the conventional H-like cross-sectional shape. This is also an advantage of the present invention. That is, the aluminum alloy forging can be manufactured cost effectively and quantity production thereof is also possible by subjecting an aluminum alloy ingot having the composition described above to homogenizing heat treatment, and thereafter subjecting the forging material with the shape of the respective embodiments of the arm described above to hot-forging using a die. Further, the forging material is subjected to conditioning such as solution heat treatment, quenching treatment and artificial aging treatment thereafter and the like to obtain the required strength (proof stress).

According to the present invention, it is possible to provide a suspension arm for an automobile capable of securing the strength (particularly the out-of-plane bending rigidity) with respect to the input load in the longitudinal direction of a vehicle and improving the natural frequency of a low order even while employing a light weight and cost effective structure. Therefore, the suspension arm for an automobile of the present invention is suitable for a suspension arm of an automobile and the like in which further weight reduction is required.

Further exemplary embodiments of L-shape vehicular the suspension arm according to the present invention may be described as follows.

In various exemplary embodiments, the L-shape vehicular suspension arm according to the present invention includes a unitary body forged from an aluminum alloy. The unitary body has an L-shape when viewed from above, the L-shape including a first arm section and second arm section joined at a joint section. The unitary body has a length L, measured from a tip of the first arm section to a tip of the second arm section in a longitudinal direction. The unitary body includes a ball joint support section at the tip of the first arm section. The unitary body includes a first bushing support section at the tip of the second arm section. The unitary body includes a second bushing support section at the joint section. The unitary body includes a web and ribs arranged between the ball joint support section, the first bushing support section, and the second bushing support section. The web is substantially planar, having a top surface, a bottom surface, and a peripheral edge, the web being arranged in a substantially horizontal plane. Each rib extends vertically from the top surface or the bottom surface of the web at the peripheral edge of the web. When viewed in a cross-section perpendicular to the longitudinal direction at a location L/4 or greater from the tip of the first arm section and L/4 or greater from the tip of the second arm section, excepting locations along the longitudinal direction where a rib is interrupted by the second bushing support section, the unitary body has a U-shape, an H-shape, or an inverted U-shape, the web forming the horizontal portions and the ribs forming the vertical portions of the respective shapes. When viewed in the cross-section perpendicular to the longitudinal direction at the location L/4 or greater from the tip of the first arm section and L/4 or greater from the tip of the second arm section, excepting locations along the longitudinal direction where a rib is interrupted by the second bushing support section, dimensions of the unitary body satisfy expression (1) or (2):

$$0.05 \leq (H-Hr)/Hr \leq 0.25 \tag{1}$$

$$4 \leq (H-Hr)/Hr \leq 19 \tag{2}$$

where H is a total height of the unitary body, and Hr is a height measured from a center of the web in a vertical direction to a lowermost point of the unitary body.

In various exemplary embodiments of the suspension arm according to the present invention, when viewed in a cross-section perpendicular to the longitudinal direction at a location L/4 or less from the tip of the first arm section or L/4 or less from the tip of the second arm section, excepting locations along the longitudinal direction where a rib is interrupted by the ball joint support section or the first bushing support section, dimensions of the unitary body satisfy expression (3):

$$(H-Hr)/Hr=1 \tag{3}$$

In various exemplary embodiments of the suspension arm according to the present invention, when viewed in the cross-section perpendicular to the longitudinal direction at the location L/4 or greater from the tip of the first arm section and L/4 or greater from the tip of the second arm section, excepting locations along the longitudinal direction where a rib is interrupted by the second bushing support section, dimensions of the unitary body satisfy expression (1):

$$0.05 \leq (H-Hr)/Hr \leq 0.25 \tag{1}$$

In various exemplary embodiments of the suspension arm according to the present invention, when viewed in the cross-section perpendicular to the longitudinal direction at the location L/4 or greater from the tip of the first arm section and L/4 or greater from the tip of the second arm section, excepting locations along the longitudinal direction where a rib is interrupted by the second bushing support section, dimensions of the unitary body satisfy expression (2):

$$4 \leq (H-Hr)/Hr \leq 19 \tag{2}$$

In various exemplary embodiments of the suspension arm according to the present invention, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, the unitary body has a U-shape.

In various exemplary embodiments of the suspension arm according to the present invention, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, the unitary body has an H-shape.

In various exemplary embodiments of the suspension arm according to the present invention, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, each rib extending vertically from the top surface of the web has a greater height than each rib extending vertically from the bottom surface of the web.

In various exemplary embodiments of the suspension arm according to the present invention, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, each rib extending vertically from the bottom surface of the web has a greater height than each rib extending vertically from the top surface of the web.

In various exemplary embodiments of the suspension arm according to the present invention, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, the unitary body has an inverted U-shape.

In various exemplary embodiments of the suspension arm according to the present invention, one or more ribs provided at a peripheral edge of the web closest the second bushing support section extend continuously from the ball joint support section to the first bushing support section.

In various exemplary embodiments of the suspension arm according to the present invention, one or more ribs provided at a peripheral edge of the web closest the second bushing support section, extending from the ball joint support section to the first bushing support section, are interrupted by the second bushing support section.

In various exemplary embodiments of the suspension arm according to the present invention, the web includes at least one trim hole extending through the web.

In various exemplary embodiments of the suspension arm according to the present invention, the web includes multiple trim holes extending through the web.

In various exemplary embodiments of the suspension arm according to the present invention, when viewed in the cross-section perpendicular to the longitudinal direction at the location L/4 or greater from the tip of the first arm section and L/4 or greater from the tip of the second arm section, excepting locations along the longitudinal direction where a rib is interrupted by the second bushing support section, a ratio of a width of each rib to a width of the unitary body is from 0.13 to 0.17.

In various exemplary embodiments of the suspension arm according to the present invention, the aluminum alloy includes 0.8-1.3 mass % Si and 0.70-1.3 mass % Mg.

In various exemplary embodiments of the suspension arm according to the present invention, the aluminum alloy further includes at least one of Cu, Zn, Fe, Mn, Cr, Zr, and Ti.

In various exemplary embodiments of the suspension arm according to the present invention, the suspension arm is manufactured by: subjecting an aluminum alloy ingot to homogenizing heat treatment; forging a shaped item from the aluminum alloy ingot using a die; and subjecting the shaped item to at least one of a solution heat treatment, a quenching treatment, and an artificial aging treatment.

Various exemplary embodiments of the present invention are described with reference to direction or spatial arrangement, such as horizontal, vertical, lowermost, etc. Such descriptors are not intended to require any particular positioning of the inventive suspension arms as whole components. Instead, such descriptors are used merely to indicate relative direction or spatial arrangement of constituent parts or portions of the inventive suspension arms.

In the above detailed description, reference was made by way of non-limiting example to preferred embodiments of the invention. Obviously, numerous modifications and variations of the present invention are possible in light of the above teachings. It is therefore to be understood that within the scope of the appended claims, the invention may be practiced otherwise than as specifically described herein.

The invention claimed is:

1. An L-shape vehicular suspension arm, comprising a unitary body forged from an aluminum alloy, wherein:
    the unitary body has an L-shape when viewed from above, the L-shape comprising a first arm section and second arm section joined at a joint section;
    the unitary body has a length L, measured from a tip of the first arm section to a tip of the second arm section in a longitudinal direction;
    the unitary body comprises a ball joint support section at the tip of the first arm section;
    the unitary body comprises a first bushing support section at the tip of the second arm section;
    the unitary body comprises a second bushing support section at the joint section;
    the unitary body comprises a web and ribs arranged between the ball joint support section, the first bushing support section, and the second bushing support section;
    the web is substantially planar, having a top surface, a bottom surface, and a peripheral edge, the web being arranged in a substantially horizontal plane;
    each rib extends vertically from the top surface or the bottom surface of the web at the peripheral edge of the web;
    when viewed in a cross-section perpendicular to the longitudinal direction at a location L/4 or greater from the tip of the first arm section and L/4 or greater from the tip of the second arm section, excepting locations along the longitudinal direction where a rib is interrupted by the second bushing support section, the unitary body has a U-shape, an H-shape, or an inverted U-shape, the web forming the horizontal portions and the ribs forming the vertical portions of the respective shapes; and
    when viewed in the cross-section perpendicular to the longitudinal direction at the location L/4 or greater from the tip of the first arm section and L/4 or greater from the tip of the second arm section, excepting locations along the longitudinal direction where a rib is interrupted by the second bushing support section, dimensions of the unitary body satisfy expression (1) or (2):

$$0.05 \leq (H-Hr)/Hr \leq 0.25 \tag{1}$$

$$4 \leq (H-Hr)/Hr \leq 19 \tag{2}$$

where H is a total height of the unitary body, and Hr is a height measured from a center of the web in a vertical direction to a lowermost point of the unitary body.

2. The suspension arm of claim 1, wherein, when viewed in a cross-section perpendicular to the longitudinal direction at a location L/4 or less from the tip of the first arm section or L/4 or less from the tip of the second arm section, excepting locations along the longitudinal direction where a rib is interrupted by the ball joint support section or the first bushing support section, dimensions of the unitary body satisfy expression (3):

$$(H-Hr)/Hr=1 \tag{3}$$

3. The suspension arm of claim 1, wherein, when viewed in the cross-section perpendicular to the longitudinal direction at the location L/4 or greater from the tip of the first arm section and L/4 or greater from the tip of the second arm section, excepting locations along the longitudinal direction where a rib is interrupted by the second bushing support section, dimensions of the unitary body satisfy expression (1):

$$0.05 \leq (H-Hr)/Hr \leq 0.25 \tag{1}$$

4. The suspension arm of claim 1, wherein, when viewed in the cross-section perpendicular to the longitudinal direction at the location L/4 or greater from the tip of the first arm section and L/4 or greater from the tip of the second arm section, excepting locations along the longitudinal direction where a rib is interrupted by the second bushing support section, dimensions of the unitary body satisfy expression (2):

$$4 \leq (H-Hr)/Hr \leq 19 \tag{2}$$

5. The suspension arm of claim 1, wherein, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, the unitary body has a U-shape.

6. The suspension arm of claim 1, wherein, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, the unitary body has an H-shape.

7. The suspension arm of claim 6, wherein, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, each rib extending vertically from the top surface of the web has a greater height than each rib extending vertically from the bottom surface of the web.

8. The suspension arm of claim 6, wherein, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, each rib extending vertically from the bottom surface of the web has a greater height than each rib extending vertically from the top surface of the web.

9. The suspension arm of claim 1, wherein, when viewed in the cross-section perpendicular to the longitudinal direction at the location L/4 or greater from the tip of the first arm section and L/4 or greater from the tip of the second arm section, excepting locations along the longitudinal direction where the rib is interrupted by the second bushing support section, the unitary body has an inverted U-shape.

10. The suspension arm of claim 1, wherein one or more ribs provided at a peripheral edge of the web closest the second bushing support section extend continuously from the ball joint support section to the first bushing support section.

11. The suspension arm of claim 1, wherein one or more ribs provided at a peripheral edge of the web closest the second bushing support section, extending from the ball joint support section to the first bushing support section, are interrupted by the second bushing support section.

12. The suspension arm of claim 1, wherein the web comprises at least one trim hole extending through the web.

13. The suspension arm of claim 1, wherein the web comprises multiple trim holes extending through the web.

14. The suspension arm of claim 1, wherein, when viewed in the cross-section perpendicular to the longitudinal direction at the location L/4 or greater from the tip of the first arm section and L/4 or greater from the tip of the second arm section, excepting locations along the longitudinal direction where a rib is interrupted by the second bushing support section, a ratio of a width of each rib to a width of the unitary body is from 0.13 to 0.17.

15. The suspension arm of claim 1, wherein the aluminum alloy comprises 0.8-1.3 mass % Si and 0.70-1.3 mass % Mg.

16. The suspension arm of claim 15, wherein the aluminum alloy further comprises at least least one of Cu, Zn, Fe, Mn, Cr, Zr, and Ti.

17. The suspension arm of claim 1, wherein the suspension arm is manufactured by:
- subjecting an aluminum alloy ingot to homogenizing heat treatment;
- forging a shaped item from the aluminum alloy ingot using a die; and
- subjecting the shaped item to at least one of a solution heat treatment, a quenching treatment, and an artificial aging treatment.

* * * * *